July 20, 1943.  H. W. GREENUP ET AL  2,324,988
APPARATUS FOR AERATING VISCOUS LIQUIDS
Original Filed May 8, 1937  7 Sheets-Sheet 3

INVENTOR
Harold W. Greenup
and
Norris Johnston
BY Ely & Frye
ATTORNEYS

INVENTOR
Harold W. Greenup
and
Norris Johnston
BY Ely & Frye
ATTORNEYS

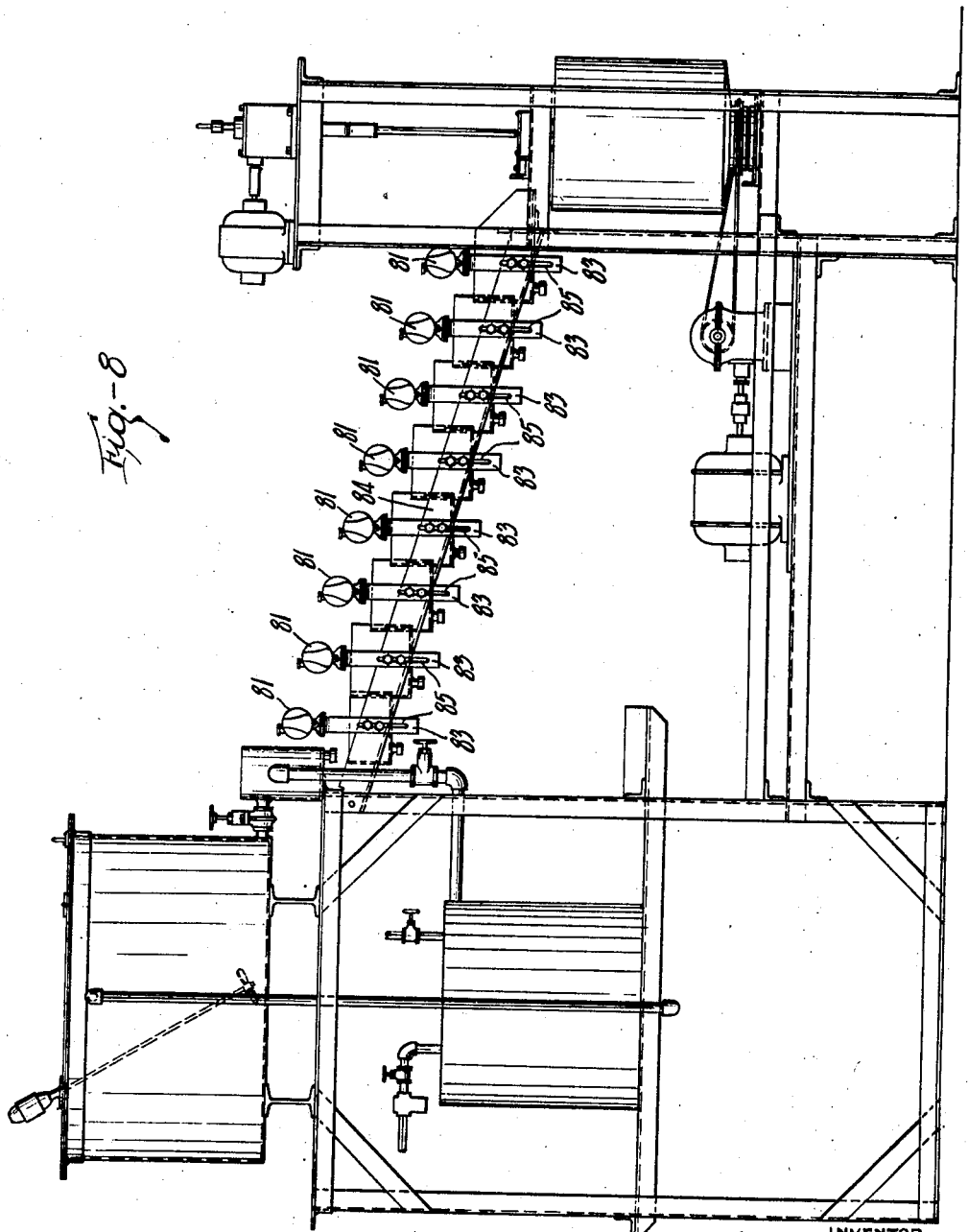

July 20, 1943.   H. W. GREENUP ET AL   2,324,988
APPARATUS FOR AERATING VISCOUS LIQUIDS
Original Filed May 8, 1937   7 Sheets-Sheet 6
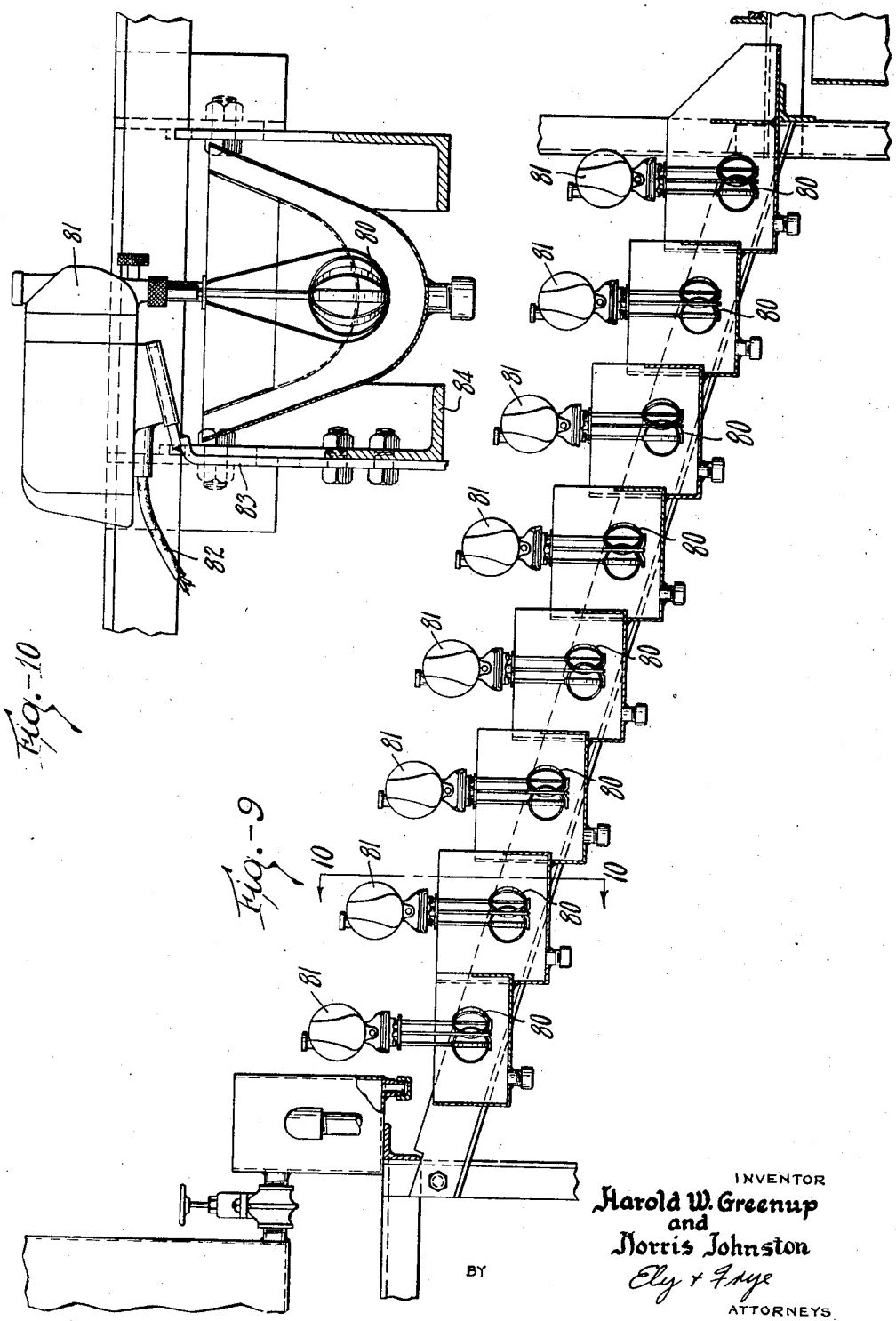
INVENTOR
Harold W. Greenup
and
Norris Johnston
BY Ely & Frye
ATTORNEYS July 20, 1943. H. W. GREENUP ET AL 2,324,988
APPARATUS FOR AERATING VISCOUS LIQUIDS
Original Filed May 8, 1937 7 Sheets-Sheet 7
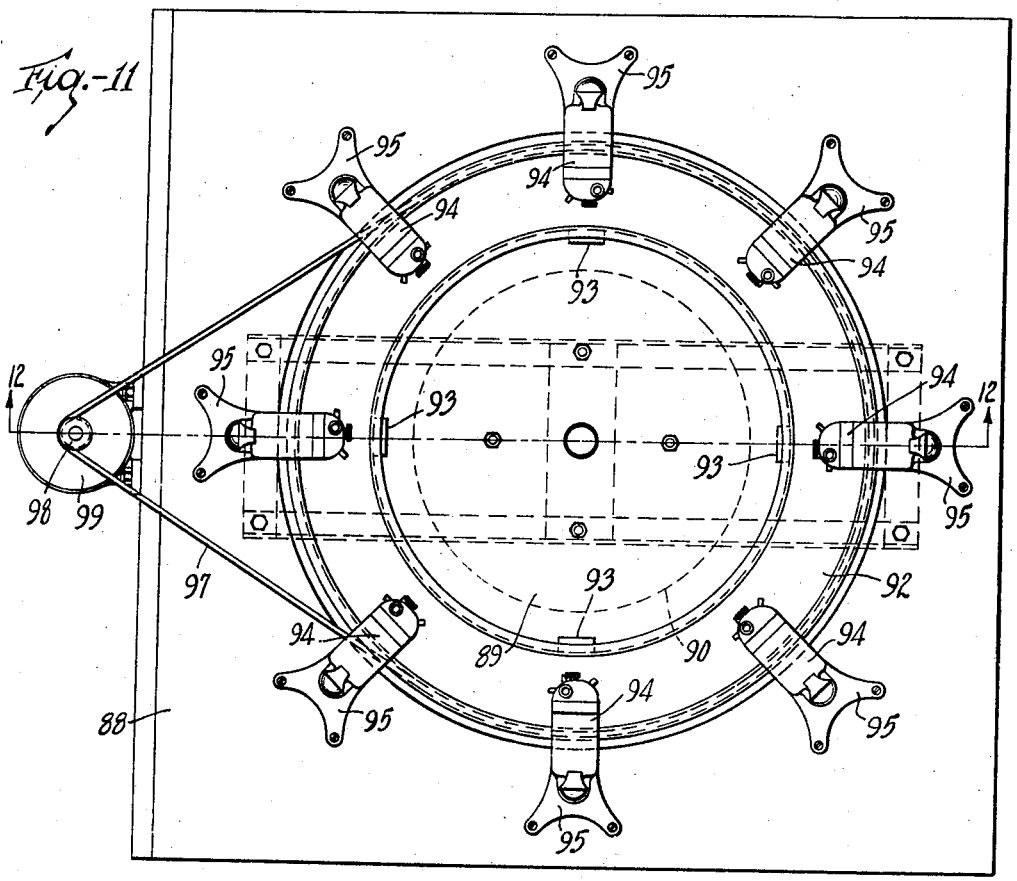
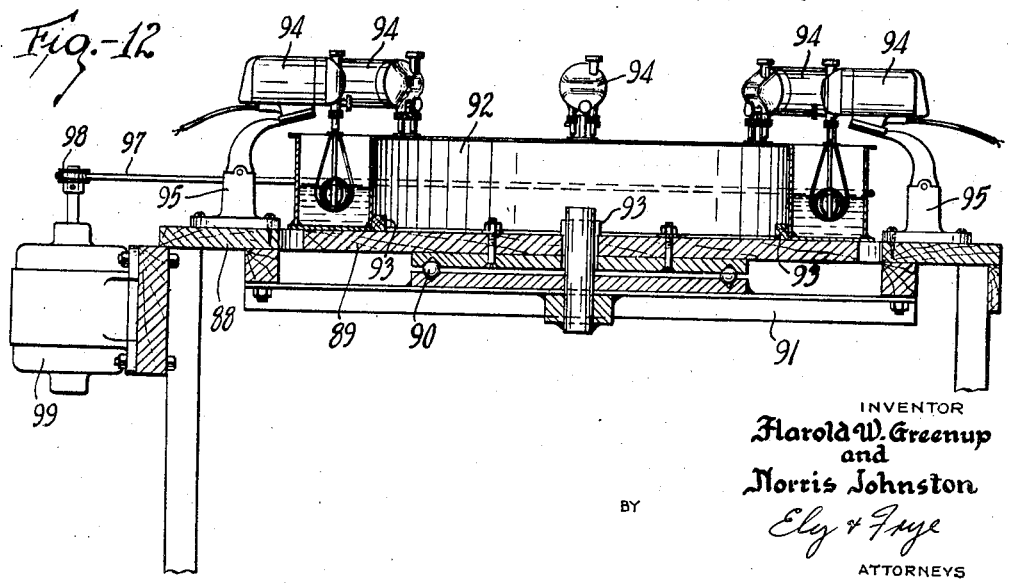
INVENTOR
Harold W. Greenup
and
Norris Johnston
BY
Ely & Frye
ATTORNEYS Patented July 20, 1943

2,324,988

UNITED STATES PATENT OFFICE 2,324,988

APPARATUS FOR AERATING VISCOUS LIQUIDS

Harold W. Greenup, Fall River, Mass., and Norris Johnston, Alhambra, Calif., assignors to The Firestone Tire & Rubber Company, Akron, Ohio, a corporation of Ohio Original application May 8, 1937, Serial No. 141,580. Divided and this application October 9, 1940, Serial No. 360,388

2 Claims. (Cl. 259—64)

This invention relates to apparatus for aerating viscous liquids, and more especially it relates to improved apparatus for frothing aqueous dispersions of rubber, such as natural latex, although any rubber dispersion can be processed by the apparatus of the invention.

The invention is of especial utility in the manufacture of vulcanized cellular or sponge rubber structures wherein the size of the cells is an important consideration, said cells being the result of the air bubbles with which the unvulcanized rubber dispersion is impregnated. By means of the present invention the size of the air bubbles may be controlled.

This application is a division of our application for Letters Patent Serial No. 141,580 filed May 8, 1937, now Patent No. 2,244,616.

The chief objects of the invention are to provide improved apparatus for frothing rubber latex. More specifically, the invention aims to produce a latex froth wherein the air bubbles are of small unit size; to provide a system for the continuous production of latex froth; to obviate coagulation of the latex resulting from violent impact thereof with the aerating apparatus; and to provide against splatter of the latex so that aeration thereof may be effected in open vessels, and mechanical difficulties arising from latex in machinery bearings will be avoided. Other objects will be manifest as the specification proceeds.

Of the accompanying drawings:

Figure 8 is a side elevation of another embodiment of the invention;

Figure 9 is a vertical section through a portion of the structure shown in Figure 8;

Figure 10 is a section on the line 10—10 of Figure 9;

Figure 11 is a plan view of still another embodiment of the invention; and

Figure 12 is a section on the line 12—12 of Figure 11.

Briefly stated, the improved aerating apparatus consists in the combination of means for forming a continuous stream of compounded rubber latex, means for effecting a gravity induced flow of latex by directing it in a course extending from a higher to a lower level, and means for subjecting the latex to a beating or whipping action at successive local regions longitudinally of said course.

Figure 1:
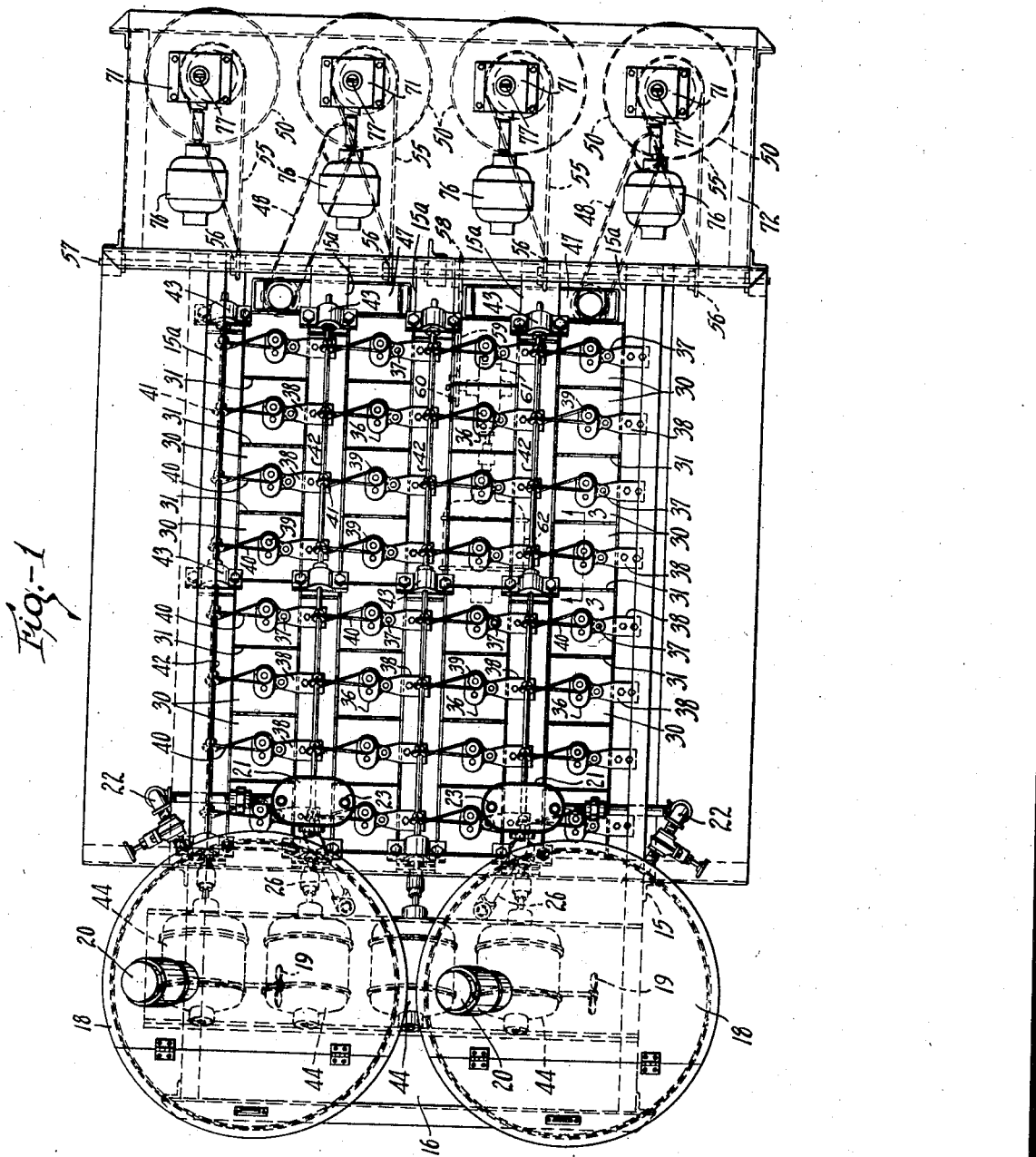
Figure 1 is a plan view of apparatus embodying the invention, in its preferred form.

The preferred apparatus is shown in Figures 1 to 7 inclusive, and a plurality of apparatus units may be arranged in side by side relation to conserve floor space, and to permit the use of structures common to two or more units, as is clearly shown in Figure 1. The apparatus comprises an open framework 15 that carries a tank 16 at one end thereof and at a low elevation, said tank extending entirely across the framework and constituting a receptacle for receiving liquid latex that overflows from a plurality of receptacles positioned at a higher elevation, as presently will be explained. The tank 16 is provided with a closable drain pipe 17 in its bottom for removing liquid therefrom. Mounted upon the top of the framework 15, at the same end thereof as the tank 16, are two receptacles or tanks 18, 18 for receiving a supply of compounded liquid latex that subsequently is to be aerated. In each receptacle 18 is an agitator 19 driven by a motor 20 atop the receptacle, said agitator keeping the latex in the receptacle in motion so as to maintain the latex at uniform consistency. The two receptacles 18 supply latex to four units of aerating apparatus, and positioned between the latter and said receptacles are devices for assuring uniform flow of latex notwithstanding variations in the head of liquid in the receptacles.

Said devices comprise small distributor receptacles 21, 21, each of which is associated with a receptacle 18 and receives latex therefrom by gravity flow through a suitably valved pipe 22. The bottom of each distributor receptacle is provided with two delivery pipes or nozzles 23, 23 that are spaced apart so as to be positioned over the receiving ends of respective aerating units. The lower end of each pipe 23 is provided with a removable apertured cap 24 that may be replaced by other caps having apertures of different sizes whereby the size of the stream of latex flowing to the aerating units is controlled. Below the level of the inlet pipe 22, each distributor receptacle is provided with an overflow port 25 connected by a pipe 26 with the overflow tank 16. In operation, latex is delivered to the distributor receptacles through pipes 22 faster than it flows therefrom through pipes 23, the surplus latex flowing through pipes 26 to the tank 16, the arrangement being such as to provide a constant determinate head of liquid above the pipes 23 at all times whereby uniformity of latex flow to the aerating units is achieved.

Figure 2:
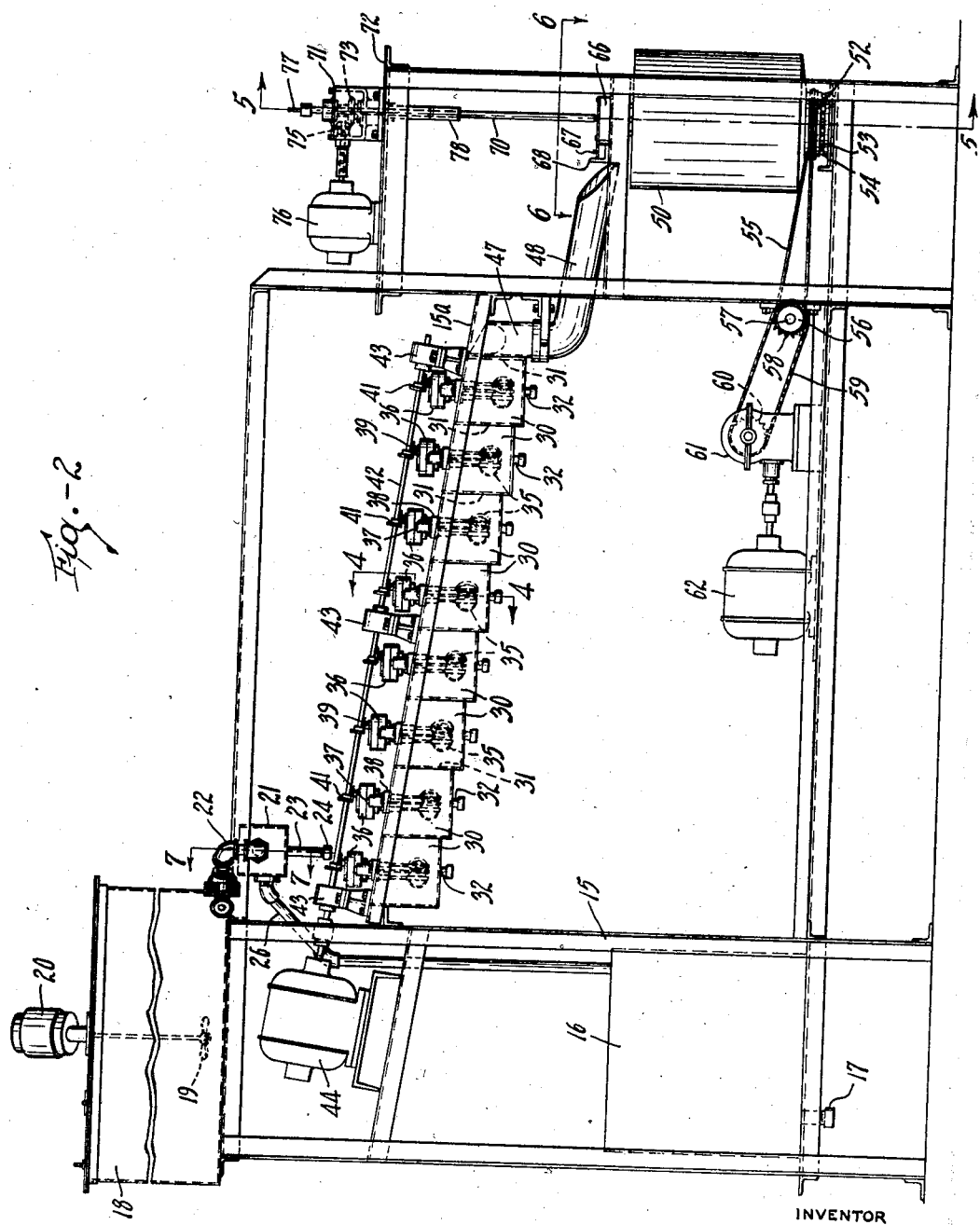
Figure 2 is a side elevation thereof.
Figure 3:
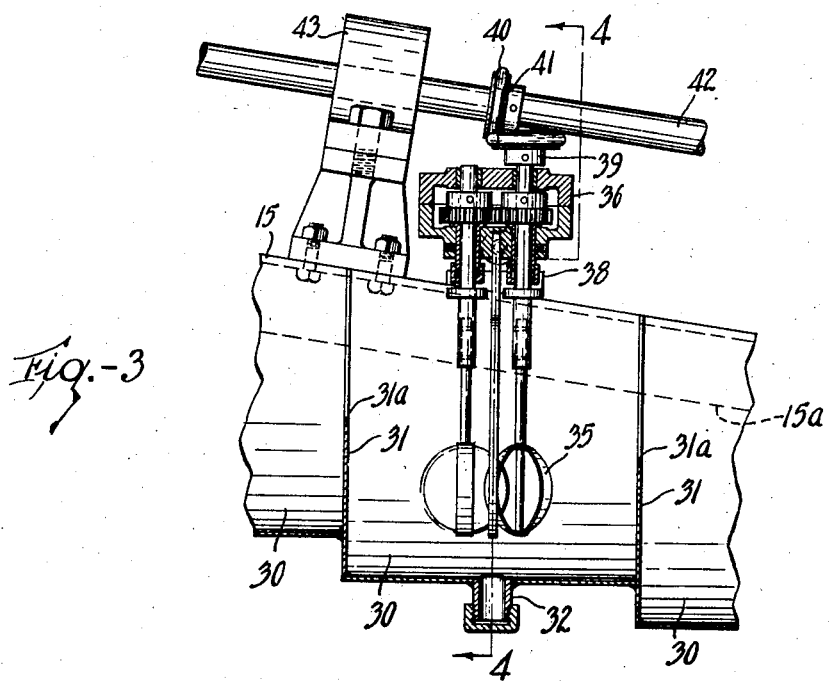
Figure 3 is a section on the line 3—3 of Figure 1 and Figure 4.
Figure 4:
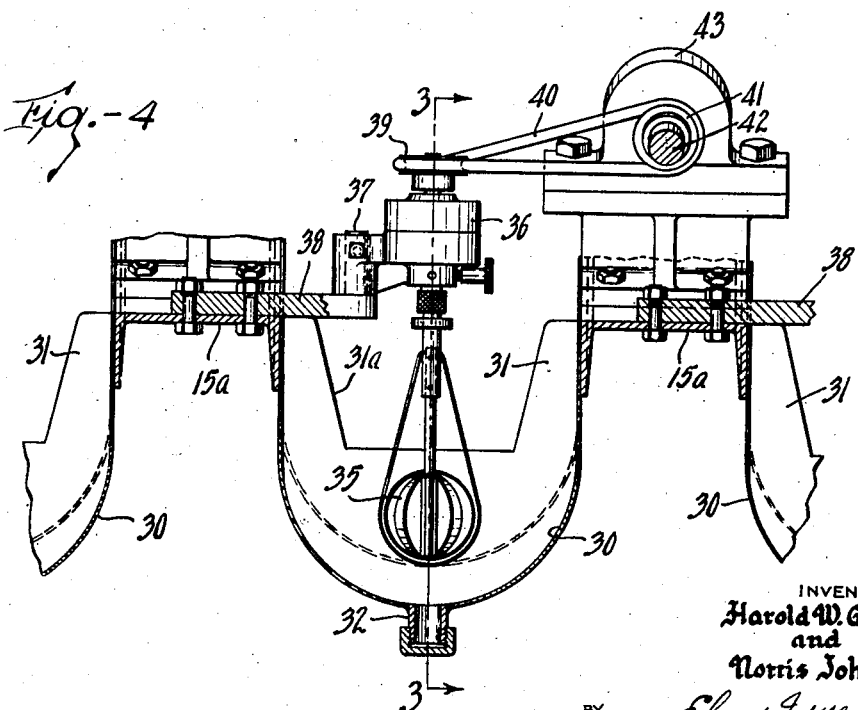
Figure 4 is a section on the line 4—4 of Figure 2 and Figure 3.

The four aerating units shown are arranged in pairs in that they deliver the frothed latex into but two delivery troughs at their delivery ends. In other respects the units are separate from each other, and are identical in structure so that a description of one will suffice for all. As shown in Figures 2 and 3, the framework 15 includes a plurality of parallel frame members 15a that extend substantially from end to end of the framework, and slope somewhat downwardly from the receiving end of the apparatus toward the delivery end thereof. Suspended between a pair of adjacent frame members 15a is a trough-like structure consisting of a series of contiguous, open compartments 30, 30 of which adjacent compartments are separated by respective walls or partitions 31, 31. The bottom of each compartment is horizontally disposed so that the structure presents a stepped appearance, and said bottoms are transversely rounded or concave, and provided with respective suitably capped drainage orifices 32. As is most clearly shown in Figures 3 and 4, the partitions 31 are deeply notched, as at 31a, to permit liquid in each compartment 30 to overflow into the adjacent lower compartment. The notches 31a are of different depths, varying from a relatively deep notch in the partition between the two uppermost compartments to a relatively shallow notch on the delivery side of the lowermost compartment. The arrangement is such that the successive compartments 30, from the receiving toward the delivery end of the apparatus, are of progressively increased capacity. Since all of the compartments are of the same area, this means that the depth of the liquid in the compartments at the lower end of the series is greater than the depth of the liquid in the upper compartments. The uppermost compartment 30 is below one of the delivery pipes 23 of a distributor receptacle 21.

Positioned within each compartment 30 of the series is a rotary beater or whip 35 which may be of the type and size commonly in household use. As is most clearly shown in Figure 3, such beaters comprise two rotary beater elements that are suitably geared together within a housing 36. The latter is adjustably mounted upon an upright stem or stud 37 that is carried by a bracket arm 38, said arm being secured to a frame member 15a at one side of the compartment. For driving the beater 35, the shaft or stem of one of the rotatable elements thereof is provided with a grooved pulley 39 about which is trained a driving belt 40, the latter also being trained about a grooved pulley 41 that is mounted upon a drive shaft 42. The drive shaft 42 is co-extensive with the series of compartments 30, being journaled in a plurality of bearing brackets 43, 43 that are mounted upon a frame element 15a, on the opposite side of the compartment from the frame element that carries bracket arms 38. At its upper end the drive shaft 42 is coupled to the shaft of an electric motor 44 that is mounted upon the framework 15 below the receptacles 18. The arrangement is such that one motor 44 drives all of the beaters 35 of one aerating unit, which beaters whip the liquid latex into a froth.

At the delivery end of the aerating unit, the lowermost compartment 30 thereof discharges into an elongate spillway or trough 47, said trough extending transversely of the apparatus so as to function as a spillway for two of the aerating units. At one of its ends the trough 47 is provided with discharge spout 48 through which the aerated fluid will flow by gravity, said spout being pivotally mounted so as to be angularly movable to alternative positions, whereby it may be caused to discharge alternatively into different receptacles.

Figure 5:
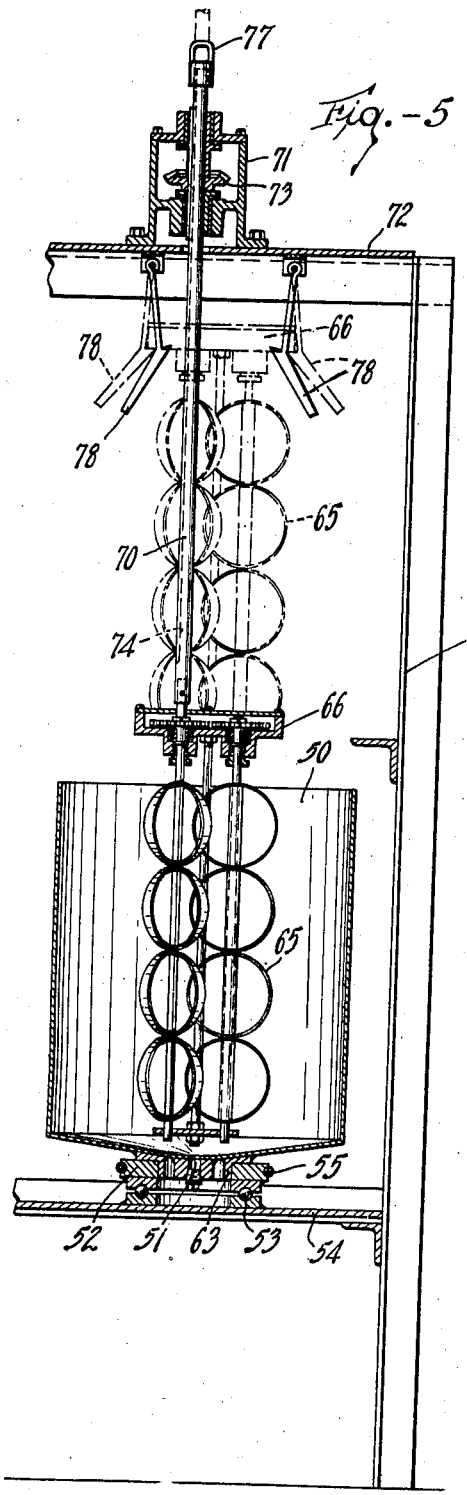
Figure 5 is a section, on a larger scale, on the line 5—5 of Figure 2.
Figure 6:
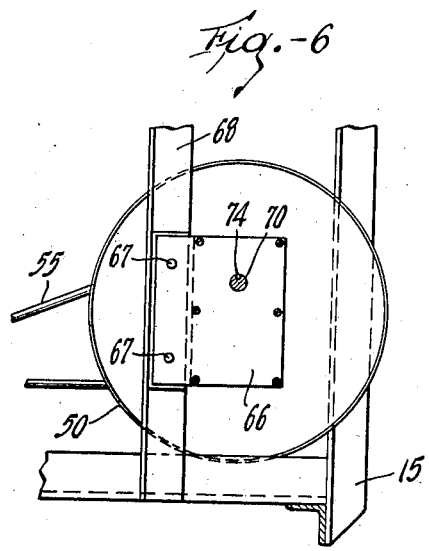
Figure 6 is a section, on a larger scale, on the line 6—6 of Figure 2.
Figure 7:
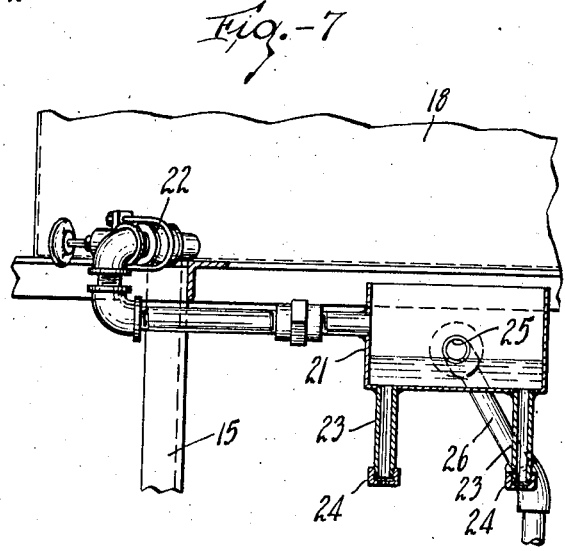
Figure 7 is a section, on a larger scale, on the line 7—7 of Figure 2.

Positioned at the delivery end of the apparatus are four receptacles 50, 50 for receiving aerated liquid from the delivery spouts 48. As shown in Figure 5, each receptacle 50 is a cylindrical structure that has a closable, axial drainage port 11 in its bottom. The receptacle 50 is rotated upon its axis, and means is provided for stirring the frothed latex that flows thereinto, to maintain the latter at uniform consistency and to assure proper admixing therewith of other constituents, such as a coagulating medium, that is introduced into a batch of froth immediately before the froth is poured into a mold. The swingable feature of each spout 48 makes it possible for the spout to discharge into one receptacle 50 while the adjacent receptacle is removed from the apparatus for emptying and cleaning.

For effecting rotation of the receptacles 50, each of them is mounted upon a turntable 52 that is supported upon a bearing structure 53 carried by a shelf 54 on the framework 15. The turntable 52 is peripherally grooved to receive a driving belt 55 that also passes around a driving pulley 56 that is mounted upon a shaft 57, the latter also carrying a sprocket 58. The latter is engaged by a sprocket chain 59 that is driven by a sprocket 60 of a reduction gear device 61, and the reduction gear device is driven by a motor 62 to which it is coupled, said motor being mounted upon framework 15, near the bottom thereof. The turntable 52 is formed with an axial opening to receive a pilot structure 63 on the bottom of receptacle 50 for centering the receptacle on the turntable. There is but one motor 62, reduction gear device 61 and shaft 57, the latter carrying four pulleys 56 by means of which all four receptacles 50 are rotated.

For stirring the contents of each receptacle 50, an agitator 65 is provided, which agitator has an operative position within the receptacle and an inoperative position above the same. The agitator 65 is somewhat similar to the beaters 35, but is larger and longer. It comprises two rotary elements that are geared together at their upper ends, the gears being enclosed in a housing structure 66. The latter comprises a top plate that projects laterally of the housing, and is formed with a pair of spaced apart apertures in which are receivable a pair of studs 67, 67 that project upwardly from a cross-member 68 carried by the framework 15. The arrangement is such that the agitator will be supported by cross-member 68 when it is in operative position, the studs 67 preventing angular movement of the agitator from torque reaction during the operation thereof.

The agitator 65 is driven by means of a vertical drive shaft 70 connected at its lower end to one of the rotatable elements of the agitator. The shaft 70 extends upwardly through a gear box 71 mounted upon a shelf 72 upon the top of the framework 15. Keyed upon shaft 70, within said gear box, is a bevel gear 73, said shaft being formed with an elongate keyway 74 so that it may be moved axially, relatively of said gear. Meshed with gear 73 is a bevel gear 75 that is directly connected to the shaft of a motor 76 so as to be driven thereby, said motor being mounted upon the shelf 72 exteriorly of the gear box 71. The upper end of the shaft 70 is provided with a loop 77 whereby it may be manually grasped for lifting the shaft and thereby raising the agitator out of the receptacle 50, as indicated in broken lines in Figure 5. For retaining the agitator in raised, inoperative position a pair of pendulous hooks 78, 78 are mounted upon the under side of shelf 72, said hooks being adapted to engage the under side of housing structure 66, in the elevated position of the latter, as shown in Figure 5.

Because the notches 31a of the partitions 31 are of greater depth between the compartments 30 at the upper or receiving end of the series, it follows that the depth of the liquid in the respective compartments will be progressively greater toward the lower or delivery end of the series. And this differential in depth will be accentuated by reason of the frothing of the liquid, which increases the viscosity of the liquid and causes it to flow from one compartment to the next in a progressively thicker stream. All of the beaters 35 are positioned in the respective compartments 30 at the same distance from the bottoms thereof, with the result that they are thereby immersed to different depths in the liquid therein. At the upper end of the series of compartments the beater is only about half submerged. In the lowermost compartment the beater is disposed well below the level of the froth.

The action of the beaters in the liquid latex is to whip the latter, and set up a circulation of the liquid which causes it to flow outwardly away from the beater near the bottom of the container, thence upwardly along the sides of the container, and then inwardly toward the beater at the top of the body of liquid. Because it is desirable that all the liquid in each container be set in circulation, the size of the container bears a definite relation to the size of the beater. Best results are obtained if the greatest width of the container is not more than four times the greatest width of the beater. The speed at which the beaters 35 are driven also is important, since it must be great enough to produce a substantial vortex. Experience has shown that a speed of 1,100 R. P. M. gives satisfactory results. Because of the latter, and because the beaters at the receiving end of the series of compartments are not completely submerged in the latex, the result of the beating is to impregnate the latex with a multiplicity of relatively large air bubbles, thus forming a froth. As the latter cascades to the other, lower compartments 30, it is subjected to successive whipping actions by the other beaters. Because the latter are completely submerged in the froth, their action does not draw more air into the froth, but breaks up and divides the bubbles already therein so that the froth that flows into trough 47 is extremely light and viscous, and of much greater volume than the stream flowing from nozzle 23.

Splattering of the latex during the frothing thereof is undesirable for the reason that it causes coagulation of the particles that are subjected to violent impact. The viscosity of the latex is a factor that affects splatter, so also is the peripheral velocity of the beater elements. Since the beaters are required to rotate at sufficient speed to cause the latex to assume a vortex, it is necessary that the size of the beaters be as small as is practicable. It is for this reason that beaters of the size usually found in domestic service are preferred.

The apparatus described achieves the continuous production of aerated latex. The compounded liquid latex flows in a uniform stream into the uppermost of the compartments 30, where it is whipped into a froth containing relatively large air bubbles, and overflows therefrom into a succession of other compartments where the whipping is repeated to reduce the size of the said air bubbles. From the lowermost compartment 30 the froth flows through spout 48 to one of the receptacles 50 where it is continuously stirred until a sufficient amount accumulates to constitute a batch. Thereupon other ingredients, including a coagulant, are stirred into the batch, after which the drive of motor 76 is stopped, the agitator 65 is elevated to inoperative position, and the receptacle 50 removed from the apparatus and its contents disposed of. Before the receptacle 50 is removed as described, the spout 48 is swung angularly so as to discharge into an adjacent receptacle 50.

Aside from the advantages accruing from continuous production, the invention provides for the mechanical frothing of latex, it provides a superior product due to the absence of frothing agents, and it achieves the other advantages set out in the foregoing statement of objects.

The embodiment of the invention shown in Figures 8 to 10 inclusive consists of a single apparatus unit that is essentially similar to a unit of the apparatus previously described, so that a detail description of the modified structure will not be required. The primary difference between the two embodiments is the feature of an individual drive for each of the beater devices. As is shown most clearly in Figure 10, each beater 80 is driven by an electric motor that is mounted within a housing 81, said motor being connected with a source of power through conductor cord 82. The housing 81 is mounted upon the overhanging portion of an inverted L-shaped bracket arm 83 that is bolted or otherwise secured to an angle member 84 that constitutes a part of the framework of the apparatus. Preferably the attaching bolts extend through a slot 85 extending longitudinally of the bracket arm, whereby vertical adjustment of the latter is effected. The arrangement permits the beater to be positioned at the optimum distance from the bottom of the latex compartment. Fig. 9 most clearly shows the relation of the beaters to the height of the partitions between the adjacent compartments.

The beaters 80, like all household beaters, are equipped with means for varying their speed, the usual arrangement providing three different speeds. This makes it possible to drive the beaters at optimum speed, or at differential speeds if better results may be obtained thereby. Thus the modified embodiment of the invention possesses greater flexibility than that previously described.

The modified embodiment of the invention shown in Figs. 11 and 12 differs essentially from those previously described in that it does not produce a continuous supply of froth. It comprises a table 88 of which the middle portion consists of a circular turntable 89 that rests upon a bearing structure 90 carried by a light framework 91 secured to the under side of the table. The turntable 89 supports an annular trough 92 that is centered upon the turntable by means of a plurality of upstanding lugs 93 on the latter. Mounted upon the table top, outwardly of the turntable 89, is an annular series of electrically operated beaters 94, 94. Each of said beaters is provided with a base member 95 to which it is pivoted, the arrangement being such that the beaters may be positioned within the trough 92, as shown, or tilted backward away from the trough to permit the latter to be lifted off the turntable. The turntable 89 and trough 92 are rotated about their common axis by means of a drive belt 97 that is trained about the outer periphery of the trough, and about a drive pulley 98 that is carried upon the shaft of a motor 99, the latter being mounted, upon a vertical axis, upon the side of table 88.

In the operation of this embodiment of the invention, a quantity of compounded rubber latex, sufficient almost to cover the beater elements as shown, is placed in the trough 92. The latter is then rotated and the several beaters put into operation, with the result that the liquid in the trough is carried past the beaters in continuous succession, said beaters whipping the liquid into a froth. When the froth attains the desired consistency, the operation is concluded, the beaters are tilted, and the trough removed from the turntable and emptied.

It will be seen that the apparatus depicted in Figures 11 and 12 is not continuous in operation, that it prepares but one batch at a time, and that the size of the batch is definitely limited. The quality of the froth produced, however, is satisfactory, and other objects of the invention are achieved.

Other modification may be resorted to without departing from the spirit of the invention, or the scope of the invention as defined by the appended claims.

What is claimed is:

1. In apparatus for aerating liquids, the combination of a series of containers for liquid so arranged that overflow from each container enters the adjacent container of the series, means for continuously supplying liquid to the container at one end of the series, and a beater in each of said containers, the relation of the beaters to the level of the liquid in the containers varying from partial submergence of the beater at the liquid-receiving end of the series to complete submergence of the beater at the other end of the series.

2. In apparatus for aerating liquids, the combination of a series of laterally adjoining containers for liquid arranged in a descending series so that overflow from each container enters the next lower container, adjacent containers of the series being separated by a partition, the partitions at the upper end of the series extending at a less height above the bottom of their respective containers than the partitions at the lower end thereof to provide a progressively increasing depth of liquid toward the lowermost end of the series, means for continuously supplying liquid to the container at the uppermost end of the series, and a beater in each of said containers, said beaters being positioned uniformly with relation to the bottoms of the containers and at different elevations with relation to the tops of the partitions of the series.

HAROLD W. GREENUP.
NORRIS JOHNSTON.